United States Patent [19]

Mizutani et al.

[11] Patent Number: 4,823,388

[45] Date of Patent: Apr. 18, 1989

[54] COMMUNICATIONS NETWORK USING AN ENCIPHERING AND DECIPHERING DEVICE

[75] Inventors: Hiroyuki Mizutani, Yokohama; Takashi Kamitake, Tokyo, both of Japan

[73] Assignee: Kabushiki Kaisha Toshiba, Kawasaki, Japan

[21] Appl. No.: 14,213

[22] Filed: Feb. 5, 1987

Related U.S. Application Data

[63] Continuation of Ser. No. 739,282, May 30, 1985, abandoned.

[30] Foreign Application Priority Data

Jun. 25, 1984 [JP] Japan ................................ 59-130534

[51] Int. Cl.$^4$ ............................................. H04L 9/00
[52] U.S. Cl. ....................................... 380/23; 380/24; 380/25; 380/29
[58] Field of Search ...................................... 380/23-25, 380/28, 29; 235/374-382

[56] References Cited

U.S. PATENT DOCUMENTS

| | | | |
|---|---|---|---|
| 4,215,421 | 7/1980 | Giraud | 178/22.09 |
| 4,264,782 | 4/1981 | Konheim | 380/25 |
| 4,315,101 | 2/1982 | Atalla | 380/24 |
| 4,386,233 | 5/1983 | Smid et al. | |
| 4,393,269 | 7/1983 | Konheim et al. | 380/25 |
| 4,423,287 | 12/1983 | Zeidler | 178/22.08 |
| 4,438,824 | 5/1984 | Mueller-Schloer | 380/23 |
| 4,453,074 | 6/1984 | Weinstein | 178/22.11 |
| 4,503,287 | 3/1985 | Morris et al. | 178/22.13 |
| 4,536,647 | 8/1985 | Atalla et al. | 380/24 |
| 4,549,075 | 10/1985 | Saada et al. | 380/25 |
| 4,590,470 | 5/1986 | Koenig | 380/23 |
| 4,625,076 | 11/1986 | Okamoto et al. | 380/23 |
| 4,633,036 | 12/1986 | Hellman et al. | 380/25 |
| 4,658,094 | 4/1987 | Clark | 380/28 |
| 4,723,284 | 2/1988 | Munck et al. | 380/23 |

FOREIGN PATENT DOCUMENTS

| | | |
|---|---|---|
| 0063794 | 4/1982 | European Pat. Off. . |
| 0077238 | 9/1982 | European Pat. Off. . |
| 1399020 | 6/1975 | United Kingdom . |

OTHER PUBLICATIONS

FIPS Publication #46, Jan. 15, 1977 Data Encryption Standard.
IEEE Standard Dictionary of Electrical and Electronics Terms, 3rd Edition 1984.

*Primary Examiner*—Salvatore Cangialosi
*Attorney, Agent, or Firm*—Oblon, Fisher, Spivak, McClelland & Maier

[57] ABSTRACT

A communications network system is constructed by connecting a plurality of customer terminals to one central terminal via communication lines. Enciphering devices and a deciphering device, such as IC (integrated circuit) cards, are provided for the terminals. In order to achieve a digital signature for a transaction message sent from a customer to the center, the message is enciphered according to a prescribed enciphering algorithm using a key word that can specify the sender and the transaction. At the central terminal the enciphered message is deciphered according to a prescribed deciphering algorithm that is different from the enciphering algorithm using a key word which can specify the sender and the transaction. The key data and encipering and deciphering algorithms are sealed in the enciphering and deciphering devices such that they cannot be accessed from the outside.

15 Claims, 4 Drawing Sheets

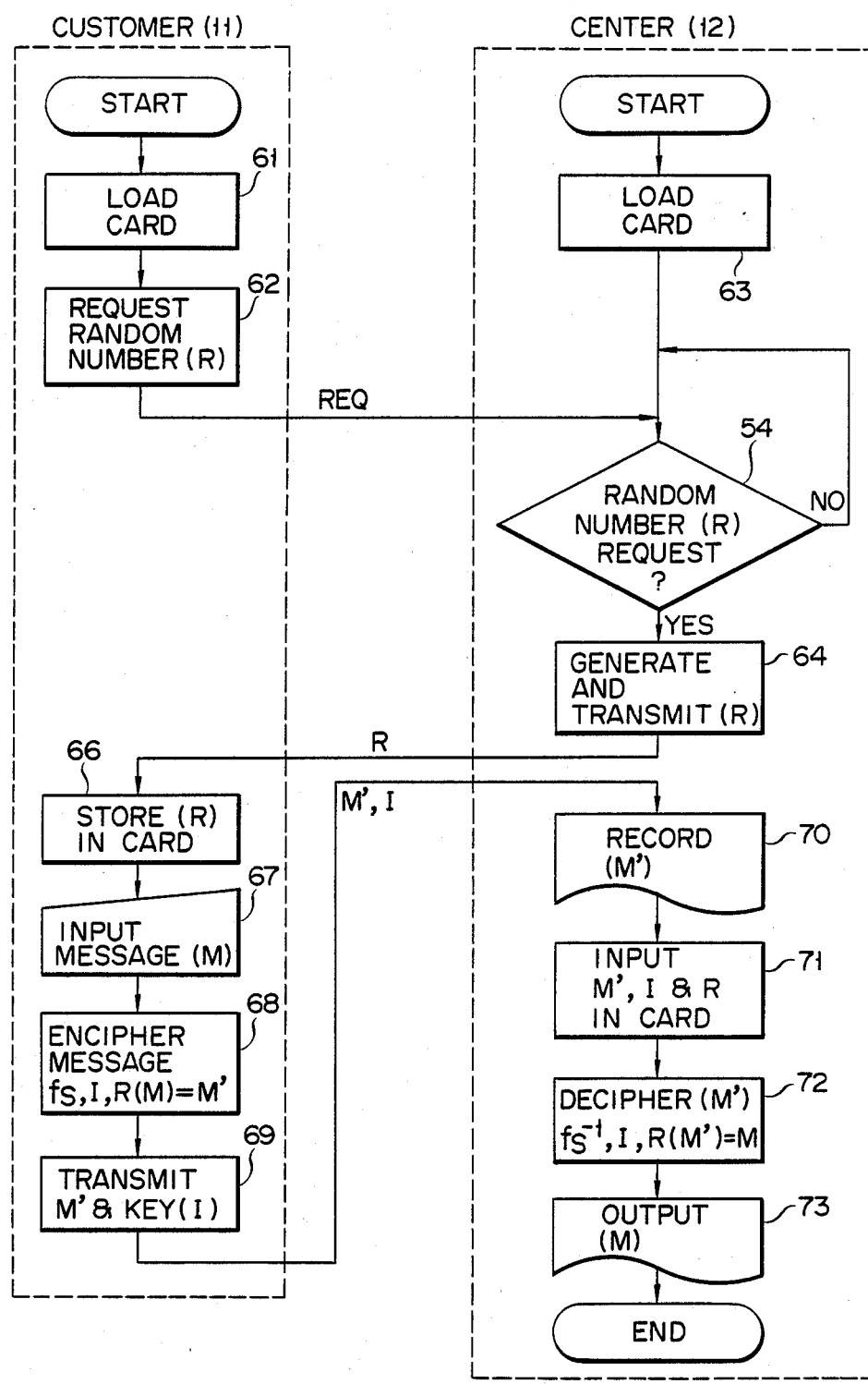

COMMUNICATIONS NETWORK USING AN ENCIPHERING AND DECIPHERING DEVICE

This application is a continuation of application Ser. 739,282, filed on May 30, 1985, now abandoned.

BACKGROUND OF THE INVENTION

This invention relates to a communications network and, in particular, to a communications network whose operation is based on encrypted messages between terminals.

Recently, together with the development of electronic technology there have been developments in systems such as home banking and shopping, and office banking systems using advanced communications systems. A vital concern in regards to a communications network system for money transactions is the guarantee of secrecy and security of these transactions. It is necessary to increase the verifiability of the transactor or communication message which is transmitted and received between transactors through the communication network.

The classical types of irregularities that can occur in the transmission of transactions or messages are as follows.

(1) False reports. A sender reports not sending to the receiver although in actuality a transmission was made, or the sender reports sending although no transmission was made.

(2) Forgery of documents. Receiver rewrites communication message that has been recorded on the receiving side, or makes a forged communication message.

These kinds of irregularities are the basis of embezzlement.

In a prior art system, in order to prevent these irregularities, an enciphering program such as DES (Data Encryption Standard) is stored in each network terminal to prevent the forging of communication messages. This means that an enciphering/deciphering circuit is provided in each terminal and that a sender, using his own key, enciphers a message according to this enciphering program. The enciphered message is transmitted to a receiver terminal through a communication network. On the receiver side, the received enciphered message is recorded and deciphered in the deciphering circuit using a key word which is stored in a key memory and peculiar to the sender. Accordingly, assuming that the key word stored in the key memory on the receiver side has not leaked to the outside, and that the receiver has not forged the message, there is no one other than the sender who knows the key word who can make the recorded enciphered message. Accordingly, the verifiability of the enciphered message stored on the receiver side is very high. This kind of a system where no one other than a specific person can prepare the message is amenable to the use of digital signatures.

In general, however, it is impossible to preclude irregularities by the receiver, who knows the contents of the key memory and may, with the use of a computer, prepare the enciphering program and, with the special key word of a sender, prepare a false enciphered message. Consequently, with this kind of communications network, it is impossible to completely prevent irregularities from being prevented by both sides, making it difficult to ensure the secrecy and security of the transactions conducted over the network.

SUMMARY OF THE INVENTION

An object of this invention is to provide a communications network in which digital signatures can be used.

Another object of this invention is provide a communications network in which the security of the transactions are ensured.

This invention is a communications network in which a plurality of transmitter terminals (customers) are connected to one receiver terminal (center). The customer and center terminals respectively have enciphering and deciphering devices such as integrated circuit cards (IC cards). The enciphering device comprises key memory means for storing key data which can specify a sender of a message to be sent to the center and the message, and enciphering means which uses this key to encipher the message according to a prescribed enciphering algorithm and outputs the enciphered message and the key data specifying the sender. The deciphering device at the central terminal comprises key memory means for storing key data which can specify the sender of a message to the center and the message, and deciphering means which uses this key to decipher the message according to a prescribed deciphering algorithm and outputs the deciphered message. The enciphering and deciphering devices are sealed so that access from the outside to the key data and enciphering and deciphering algorithms is impossible.

The key data for enciphering and deciphering includes a key word peculiar to a customer, such as the customer's name, a key word common to the communications network, and a key word such as a random number which specifies a transaction and is sent from the central terminal in response to a request from the customer. The key word peculiar to the customer and the key word shared with the network are stored in the enciphering device in such a way that they cannot be rewritten. The key word common to the network cannot be read out. With this kind of system digital signatures are possible by storing the enciphered message in a proper form, thus ensuring the security of the transaction.

The system of this invention is applicable to 2-way communications networks. With 2-way communications networks, a message sent from the central terminal to a customer side terminal is enciphered according to the deciphering algorithm in the deciphering device in the central terminal, and the enciphered message is deciphered according to the enciphering algorithm in the customer side terminal.

BRIEF DESCRIPTION OF THE DRAWINGS

The invention may be better understood by reference to the drawings in which:

FIG. 6 is a flowchart showing the operation of the system of this invention.

DETAILED DESCRIPTION OF THE PREFERRED EMBODIMENTS

Figure 1:
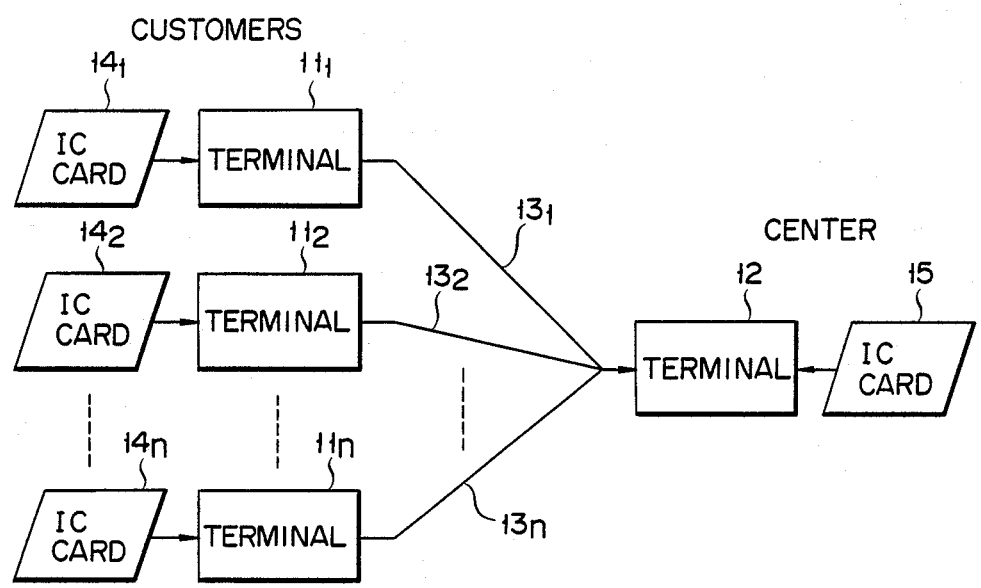
FIG. 1 shows a communications network system according to an embodiment of this invention.

FIG. 1 shows a communications network according to this invention, which is suitable for use in home banking and shopping systems, and office banking systems. This network is a 1:n system in which a plurality of customer terminals $11_1$, $11_2 \ldots 11_n$ located in the homes or businesses are connected by communication lines $13_1$, $13_2 \ldots 13_n$ to a single central terminal located in a bank or department store.

In this embodiment a message is sent from a customer terminal to the central terminal. Customer terminals $11_1$–$11_n$ are equipped with insertable portable cards $14_1$–$14_n$, which are enciphering devices. The central terminal 12 is equipped with a portable insertable card 15, which is a deciphering device.

Figure 2:
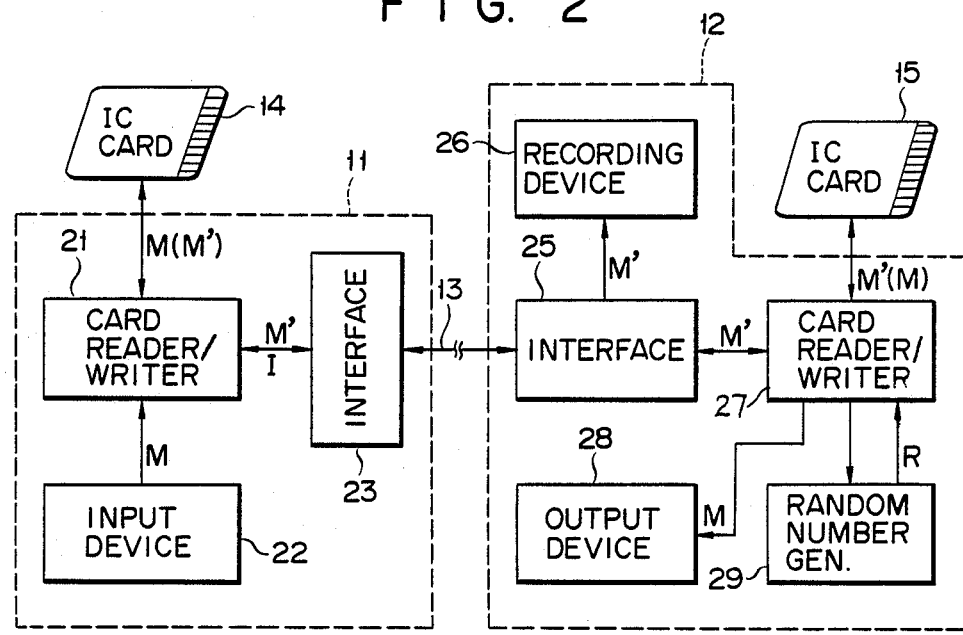
FIG. 2 is a schematic of customer and center terminals.

As shown in FIG. 2, customer terminal 11 comprises card reader/writer for reading or writing required data in card 14 when it is inserted, input device 22, such as a keyboard, for inputting message M into card 14 via card writer 21, and communication interface 23 for modulating the enciphered message M' prepared inside the card in a prescribed format for transmission via communication line 13 to the central terminal.

Central terminal 12 comprises communication interface 25, which demodulates the message sent from the customer via line 13 into the enciphered message M', recording device 26 such as a disc apparatus for recording this enciphered message, card reader/writer 27 for reading or writing required data in card 15 when it is inserted, output device 28 for printing out message M deciphered by card 15 inserted into card reader/writer 27, and random number generator 29 for generating random number R, which indicates a transaction number of message M produced in the customer terminal. Since the transaction number is generated at random the generating timing is recorded at the central terminal.

Figure 3:
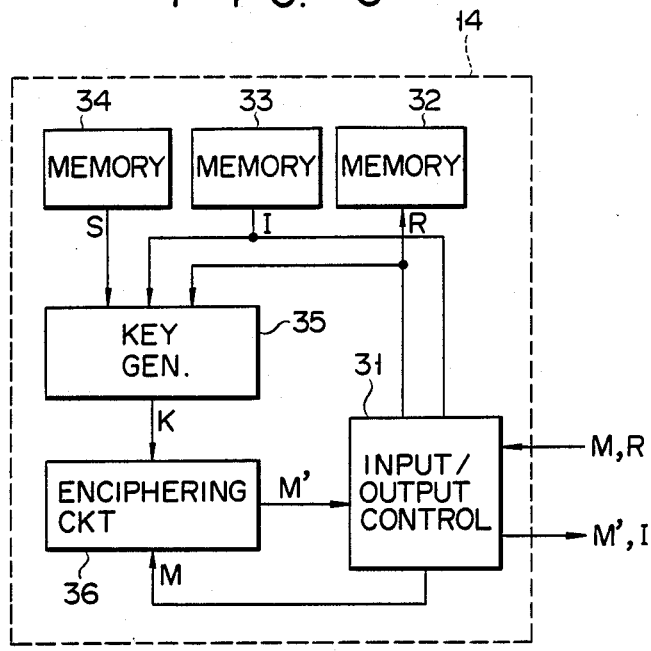
FIGS. 3 and 4 are conceptual schematics of enciphering and deciphering devices used in the customer and central terminals.
Figure 4:
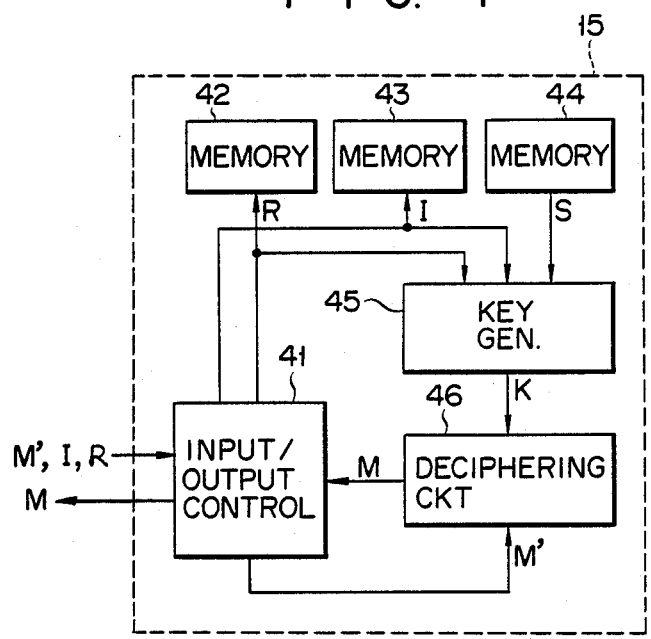

Portable enciphering device 14 and deciphering device 15 may be constructed of an IC card such as that shown in Japanese Patent Publication No. 53-6491. A semiconductor integrated circuit (LSI) is sealed in the card and it is impossible to extract data other than that specified. FIGS. 3 and 4 are conceptual functional schematics of IC card 14 used in the customer terminal and IC card 15 used in the central terminal.

Card 14 of FIG. 3 may be considered to comprise input/output control circuit 31, memories 32, 33, 34, key generator 35, and enciphering circuit 36. Input/output control circuit 31 receives and outputs the required data between the card and the outside. The data that can be input into card 14 via input/output control circuit 31 is message M and key word R. Message M is input by the user via the customer terminal. Key word R, which is a random number indicating the transaction produced at the central terminal, is stored in memory 32. A person's key word I, which is the ID data such as the name of the person using the card, is stored in memory 33. Key word I can only be read out; it is not possible to rewrite it. A common key word (number) S, which indicates the network system, is stored in memory 34 in an unrewritable form. It is also impossible to read out this common key word S and which is known to only a very limited number of people, such as the issuer of the card, for example.

Key words R, I, S stored in memories 32–34 are supplied to key generator 35. The key word generator executes an EXCLUSIVE OR operation on the input key words R, I, S and generates enciphering key word K, which is supplied to enciphering circuit 36 for enciphering. Enciphering circuit 36 uses this key word together with the message M input by the user through input/output control circuit to produce an enciphered message M' according to an enciphering algorithm. This enciphered message is output from the card together with the user's particular key word I via input/output control circuit 31, and is sent to the central terminal.

Card 15, which is used at the central terminal, comprises input/output control circuit 41, memories 42, 43, 44, key generator 45, and deciphering circuit 46. What should be paid attention to here is that the user's card 14 is applicable only for enciphering and the central terminal card 15 is applicable only to deciphering the enciphered message. The data signal input to card 15 via input/output control circuit 41 is only enciphered message M', key word R (random number) and key word I. Enciphered message M' is supplied to deciphering circuit 46. Key word R and I are stored in memories 42 and 43, respectively. Key word S is stored in memory 44 in such a manner that it cannot be output from the card and cannot be rewritten. Key words R, I, S are supplied to key generator 45 which computes the EXCLUSIVE OR operation of the input key words in the same manner as that in the user's card, and generates key word K for deciphering. Deciphering circuit 46 uses deciphering key K to decipher message M' according to a prescribed deciphering algorithm. Deciphered message M is output from the card via input/output control circuit 41.

Figure 5:
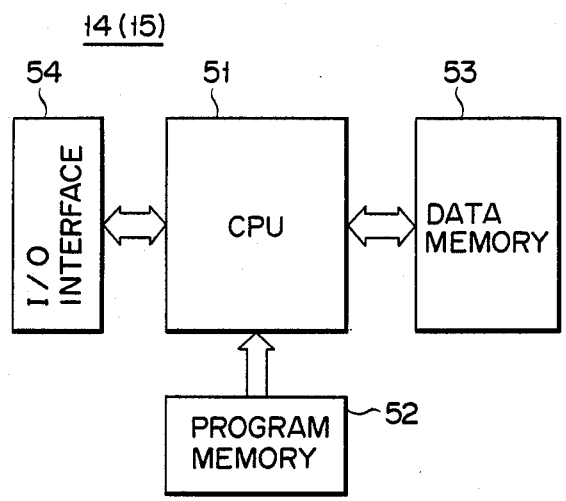
FIG. 5 shows a practical arrangement of the enciphering and deciphering devices.

The above was a description of the function blocks for cards 14 and 15 in conjunction with FIGS. 3 and 4. In practice the cards are constructed of microprocessors. FIG. 5 shows a suitable construction for such a card. Cards 14, 15 comprise central processing unit (CPU) 51, program memory 52 (preferably mask ROM) containing an enciphering (deciphering) program and operating program, data memory 53 (preferably permanent type memory PROM), and I/O interface 54. The functions of the key generator, enciphering (deciphering) circuit, and input/output control circuits shown in FIGS. 3 and 4 are performed by CPU 51 responsive to program memory 52, and the memories for key words S and I correspond to data memory 53. RAM (random access memory) included in CPU 51 can be used for the memory for key word R. The program memory of the user's card 14 stores the enciphering program and central card 15 stores the deciphering program.

The following is a description of the operation of the network system shown in FIG. 1, with reference to the operation flowchart of FIG. 6.

When a customer sends message M to the central terminal, card 14 is set in terminal 11 as shown in block 61. When the card is loaded into card reader/writer 21, the card reader/writer requests a random number key word R to the central terminal (block 62). Card 15 is already loaded into the central terminal (block 63). The reason for this is that the customer has called the center via telephone indicating a wish to send a message. Card reader/writer 27 of central terminal 12 confirms the presence of a request from the user terminal for random number key word R (block 64). When confirmation is made, a random number request signal is applied to random number generator 29, and a random number key word R is sent to the customer terminal (block 64). On the customer side key word R is stored in RAM (corresponding to memory 32 of FIG. 3) of CPU 51 (block 66). The customer begins inputting message M via input device 22 (block 67). CPU 51 enciphers the message according to an enciphering algorithm such as DES, using key words S, I, R (block 68). If the enciphering algorithm which uses key data S, I, R is taken to be f, then enciphered message M' is defined by $$M' = f_K(M) = f_{S, I, R}(M) \text{ where } K = S \oplus I \oplus R.$$

Enciphered message M' is sent to the central terminal together with the personal key word I (block 69). At the center message M' is recorded in recording device 26 by card reader/writer 27 (block 70). Enciphered message M' and personal key word I, together with random number key word R are input into card 15 (block 71) whose CPU deciphers message M' based on a deciphering algorithm, using deciphering key data S, I, R (block 72). If the deciphering algorithm is taken to be $f^{-1}$, the the deciphered message M can be expressed by $$M = f_K^{-1}(M') = f_{S,I,R}^{-1}(M')$$
$$= f_{S,I,R}^{-1}\{f_{S,I,R}(M)\}$$

where, the same as with the enciphering algorithm, $K = S \oplus I \oplus R$. In the DES system, the $f \neq f^{-1}$ condition is satisfied. Namely, it is necessary that the enciphering and deciphering algorithms be different.

Deciphered message M is output by output device 28 (block 73). The transmission from the customer to the center of a transaction request message is then completed.

The following is a description of the functions for the protection of irregularities in this kind of communications network system.

The first possible irregularity is the forgery of an enciphered message M' by the customer without the use of the card. With the DES system, the enciphering algorithm is public and, accordingly, it is possible that an equivalent algorithm can be generated using a computer. However, even if such an algorithm is generated, because only a restricted number of people know the common key word S of the network system, and because this key word cannot be read out from card 14, it is impossible to generate enciphering key word K. So, it is impossible to produce enciphering message M' without card 14.

The next possible irregularity is that a customer uses his own card 14 to forge an enciphered message M' of another person. It is, however, impossible to rewrite the personal key word I that is stored in card 14 so this kind of irregularity is also impossible.

The last possible irregularity is the forging of enciphered message M' at the center. However, card 15, which is used at the center, only has the deciphering algorithm stored and it is different than the enciphering algorithm ($f \neq f^{-1}$) so the output that can be obtained from input message M is $$f^{-1}{}_{S, I, R}(M) \neq M',$$

and, accordingly, forging of enciphered message M' at the center is also impossible.

According to the embodiment of this invention, random number key word R is sent from the center to the customer terminals and is used as one of the enciphering key words. With this key word R it is possible for the timing of the transaction to be known at the center. Accordingly, even if enciphered message M' sent from the customer terminal is intercepted from the communication line, the message M' is registered in the center so it is impossible to use it after that.

As described above, in this embodiment only customers who have a card are able to encipher the input message. Quite clearly this means that according to this invention it is possible to use customer digital signatures.

In actual practice, it is desirable that the network system be 2-way network system. This means the customer terminal should have a recording device, random number generator and output circuit, the same as the central terminal. However, the use of the customer card and the central card remains the same. When the center sends a message to a customer, the message is enciphered according to the deciphering algorithm ($f^{-1}$) stored in the center card. In this case, accordingly, the same message will result in different enciphered messages at the customer terminal and at the central terminal.

Figure 7:
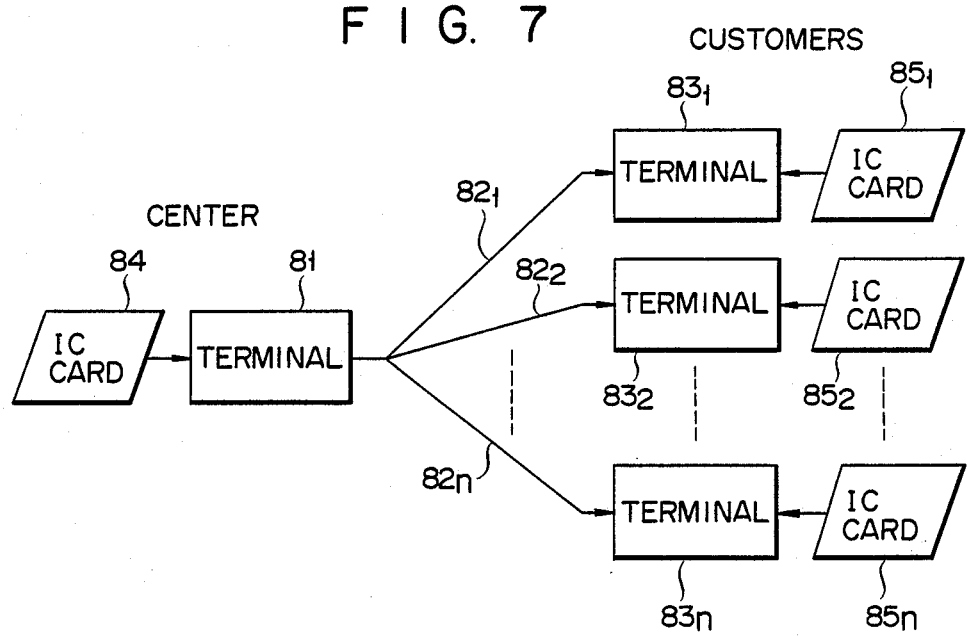
FIG. 7 shows the communications network system according to another embodiment of the invention.

FIG. 7 shows another embodiment of this invention in which a 1:n communications network system is used to send messages from the center to customers. Namely, transaction messages are sent from central terminal 81 to customer terminals $83_1$, $83_2$ ... $83_n$ via communication lines $82_1$, $82_2$ ... $82_n$. The customer terminals have random number generators and the center card 84 contains an enciphering algorithm (f), while the customer cards $85_1$, $85_2$ ... $85_n$ contain deciphering algorithms ($f^{-1}$). The network of this embodiment operates in the same way as that in the first embodiment and digital signatures are possible on the central terminal side. This network can be considered a center-to-customer two-way network. With a two-way network it is possible to use the center and customer side cards as is shown in FIG. 1.

This invention is not limited to the above embodiments. The enciphering and deciphering devices are not limited to portable card-type devices and may be cube-shaped or pencil-shaped providing an electronic circuit is sealed inside. The enciphering and deciphering algorithms are also not limited to the DES system. Any algorithm that satisfies $f \neq f^{-1}$ and has sufficient strength is acceptable. There is also no particular restriction on the type of information that may be transmitted.

What is claimed is:

1. A two-way communication network system in which a plurality of peripheral terminals and a central terminal are connected by communication lines, comprising:

each peripheral terminal comprising a first device for executing only a first algorithm which is one of an enciphering algorithm and a deciphering algorithm;

said central terminal comprising a second device for executing only a second algorithm which is the other of the enciphering algorithm and the deciphering algorithm;

said first device, when a first communication message input from outside is transmitted by a sender from said peripheral terminal to said central terminal, enciphering said message in accordance with said first algorithm, and said second device deciphering said message transmitted thereto in accordance with said second algorithm, wherein said first message operated on by said first algorithm produces a first unique signature;

said second device, when a second communication message input from outside is transmitted from said central terminal to said peripheral terminal, enciphering said second message in accordance with said second algorithm, and said first device deciphering said second message transmitted thereto in accordance with said first algorithm, wherein said second message operated on by said second algorithm produces a second unique signature;

whereby it is possible to determine a source of a message operated on by either of said first and second algorithms based on said first and second signatures.

2. The network system according to claim 7, wherein said first device stores an enciphering algorithm as said first algorithm, and wherein said second device stores a deciphering algorithm as said second algorithm.

3. The network system according to claim 2, wherein said first device comprises:
   key memory means for storing a plurality of elements of key data to specify the sender in said peripheral terminal and the communication thereof to said central terminal;
   key generating means responsive to said elements of key data for generating an enciphering key; and
   enciphering means for enciphering the first message to be transmitted to said central terminal with the enciphering key according to the enciphering algorithm, and for outputting the first message enciphered and an element of the key data to specify said sender, said first message and said elements of the key data to specify said sender being transmitted to said central terminal, and said key memory means, said key generating means and said enciphering means being sealed inside said first device such that the stored key data and the enciphering algorithm cannot be accessed from the outside.

4. The network system according to claim 3, wherein said second device comprised:
   key memory means for storing said plurality of elements of key data to specify the sender in said peripheral terminal and the communication thereof to said central terminal;
   key generating means responsive to said elements of key data for generating a deciphering key identical to said enciphering key; and
   deciphering means for deciphering, with the deciphering key according to the deciphering algorithm, the enciphered first message transmitted from said peripheral terminal to recover said first message, and for outputting the first message, said key memory means, said key generating means and said deciphering means being sealed inside said second device such that the stored key data and the deciphering algorithm cannot be accessed from the outside.

5. The network system according to claim 4, wherein said first device and second device are each a portable card containing a semiconductor circuit.

6. The network system according to claim 4, wherein said central terminal is arranged to send a key work, which can specify the communication, to a peripheral terminal in response to a request from the peripheral terminal, the key work being stored in said key memory means of said second device;
   the key data stored in said key memory means of said first device and used to encipher a message as well as to specify the sender and the communication includes a key work which is peculiar to the sender, a common word shared by the network, and a key word which specifies the communication sent from said central terminal; and
   the key data stored in said key memory means of said second device and used to decipher a message as well as to specify the sender and the message includes the key word which is peculiar to the sender, the common key word shared by the network, and the key work which specifies the communication generated by the central terminal.

7. The network system according to claim 6, wherein the key word which can specify the communication generated by said central terminal is a random number generated in compliance with a request from the sender.

8. The network system according to claim 1, wherein the DES (Data Encription Standard) system is used as the enciphering and deciphering algorithms.

9. The network system according to claim 6, wherein the key word peculiar to the sender and the key word common to the network are stored in said key memory means in an unrewritable form in said first device, and the key word common to the network is stored in said key memory means in an unrewritable form in said second device.

10. The network system according to claim 6, wherein the key word common to the network cannot be readout from said first and second devices.

11. The network system according to claim 2, wherein said first device comprises:
    key generating means for generating key data to specify the sender, and enciphering means for enciphering the first message to be transmitted to said central terminal with the key data according to the enciphering algorithm, and for outputting the enciphered first message to be transmitted to said central terminal; and
    identifying means for causing said central terminal to identify the sender, said key generating means and said enciphering means being sealed inside said first device such that the key data and the enciphering algorithm cannot be accessed from the outside.

12. The network system according to claim 11, wherein said second device comprises:
    key generating means for generating key data to specify the sender in response to said identifying means in said peripheral terminal which is transmitting the first message enciphered; and
    deciphering means for deciphering, with the key data according to the deciphering algorithm, the enciphered message transmitted from said peripheral terminal to recover the first message, and for outputting the same, said key generating means and said deciphering means being sealed inside said second device such that the key data and the deciphering algorithm cannot be accessed from the outside.

13. The network system according to claim 12, wherein said identifying means is arranged to send key data to specify the sender to said central terminal.

14. The network system according to claim 12, wherein said key generating means of each of said first and second devices comprises:
    key memory means for storing key data to specify the sender and the communication of the sender to said peripheral terminal.

15. The network system according to claim 14, wherein the key data to specify the communication of the sender to said central terminal is a transaction number which is transmitted from said central terminal to said peripheral terminal in response to a transaction request from said peripheral terminal.

* * * * *